US012734932B2

(12) United States Patent
Lu et al.

(10) Patent No.: US 12,734,932 B2
(45) Date of Patent: Sep. 15, 2026

(54) STATIC STATE OF CHARGE CORRECTION TECHNIQUES FOR LITHIUM IRON PHOSPHATE BATTERY SYSTEMS

(71) Applicant: FCA US LLC, Auburn Hills, MI (US)

(72) Inventors: Zhongjun Lu, Shanghai (CN); Jingjing Zhao, Shanghai (CN); Wenfeng Yue, Shanghai (CN); Shanqi Tang, Shanghai (CN); Yi Jiang, Wuhan (CN)

(73) Assignee: FCA US LLC, Auburn Hills, MI (US)

( * ) Notice: Subject to any disclaimer, the term of this patent is extended or adjusted under 35 U.S.C. 154(b) by 182 days.

(21) Appl. No.: 18/469,633

(22) Filed: Sep. 19, 2023

(65) Prior Publication Data

US 2025/0091474 A1 Mar. 20, 2025

(51) Int. Cl.
*B60L 58/12* (2019.01)

(52) U.S. Cl.
CPC ......... *B60L 58/12* (2019.02); *B60L 2240/545* (2013.01); *B60L 2240/547* (2013.01)

(58) Field of Classification Search
CPC ............... B60L 58/12; B60L 2240/545; B60L 2240/547
USPC ............................................................ 701/22
See application file for complete search history.

(56) References Cited

U.S. PATENT DOCUMENTS 5,982,152 A * 11/1999 Watanabe ................ B60L 3/12 320/137
6,285,163 B1 * 9/2001 Watanabe ........... G01R 31/389 324/426
7,633,297 B2 * 12/2009 Ishii .................... G01R 31/389 324/430
10,916,796 B1 * 2/2021 Zeilinger ........... H01M 50/569
11,391,779 B2 * 7/2022 Hong .................. G01R 31/374
11,656,289 B2 5/2023 Du et al.
2009/0321163 A1 * 12/2009 Suzui ................. H02J 7/00714 180/65.265
2011/0031937 A1 * 2/2011 Bito ..................... B60W 10/26 320/150

(Continued)

FOREIGN PATENT DOCUMENTS

CN 114035084 A 2/2022
CN 115754755 A 3/2023

(Continued)

*Primary Examiner* — Andrew R Dyer
(74) *Attorney, Agent, or Firm* — Jeremy J. Klobucar

(57) ABSTRACT

Static state of charge (SOC) correction for a lithium iron phosphate (LFP) battery system of an electrified vehicle includes in response to a power-off of the electrified vehicle, (i) determining an initial SOC of the LFP battery system, (ii) initiating a power-off timer and (iii) initiating a periodic temperature measurement of the LFP battery system, in response to a subsequent power-on of the electrified vehicle, (i) stopping the power-off timer, (ii) determining an average of the periodic temperature measurements of the LFP battery system, and (iii) accessing a calibrated look-up table to determine a self-discharge rate of the LFP battery system based on a value of the power-off timer and the measured temperature of the LFP battery system, and determining a corrected SOC for the LFP battery system by determining an SOC change based on the determined self-discharge rate and subtracting the SOC change from the initial measured SOC.

16 Claims, 5 Drawing Sheets

| Temperature Range (According to Target Region) | | | |
|---|---|---|---|
| SOC / Duration | 15% | 20%, 25%, ..., 90% (Interval Based On Accuracy Requirement) | 95% |
| Minimum Time (e.g., # of Days) (Self-Discharge < 4%) | Self-Discharge Rate = X% SOC | | |
| 10 Days, 15 Days, ... (Interval Based On Accuracy Requirement) | | | |
| Maximum Time (e.g., # of Days) (Self-Discharge > 80%) | | | |

(56) References Cited

U.S. PATENT DOCUMENTS

2013/0090871 A1* 4/2013 Akabori ............... G01R 19/165
702/63
2013/0229156 A1* 9/2013 Brandon ............... B60L 3/0046
320/136
2015/0112622 A1* 4/2015 Uchino .............. G01R 19/0084
702/64
2016/0259012 A1* 9/2016 Sejima ................. G01R 31/367
2017/0028868 A1* 2/2017 Minamiura ........... B60W 20/13
2018/0038918 A1* 2/2018 Nagaoka ................... H02J 7/00
2019/0359080 A1* 11/2019 Hellgren ............... B60L 3/0038
2020/0278399 A1* 9/2020 Zhang .................. G07C 5/0825
2021/0053457 A1* 2/2021 Jeon .................. H02J 7/007192
2021/0072322 A1* 3/2021 Makam ................... B60L 58/22
2021/0129826 A1* 5/2021 Furuya ................ B60W 30/194
2021/0276451 A1* 9/2021 Irie ......................... B60L 53/62
2022/0009377 A1* 1/2022 Imanaka ................. B60L 58/12
2023/0194616 A1* 6/2023 Lee ................... H02J 7/007192
324/426
2023/0211674 A1* 7/2023 Cronin .................... H02J 3/322
320/103
2023/0303091 A1* 9/2023 You ......................... B60L 53/65
2023/0311706 A1* 10/2023 Takao ................... H02J 7/0048
307/10.1
2024/0151545 A1* 5/2024 Hashimoto ........ G01C 21/3461

FOREIGN PATENT DOCUMENTS

CN 115840147 A 3/2023
KR 101238478 B1 3/2013
WO 2023027049 A1 3/2023

* cited by examiner

| Temperature Range (According to Target Region) | | | |
|---|---|---|---|
| SOC / Duration | 15% | 20%, 25%, ..., 90% (Interval Based On Accuracy Requirement) | 95% |
| Minimum Time (e.g., # of Days) (Self-Discharge < 4%) | Self-Discharge Rate = X% SOC | | |
| 10 Days, 15 Days, ... (Interval Based On Accuracy Requirement) | | | |
| Maximum Time (e.g., # of Days) (Self-Discharge > 80%) | | | |

FIG. 3

STATIC STATE OF CHARGE CORRECTION TECHNIQUES FOR LITHIUM IRON PHOSPHATE BATTERY SYSTEMS

FIELD

The present application generally relates to electrified vehicles and, more particularly, to techniques for static state of charge (SOC) correction for lithium iron phosphate (LiFePO4) battery systems.

BACKGROUND

Electrified vehicles include an electric motor powered by a battery system, such as a rechargeable lithium-ion (Li-ion) type battery system. One specific type of Li-ion battery system is lithium iron phosphate (LiFePO4) or "LFP." LFP battery systems are particularly useful for electrified vehicle applications due to their high discharge rates (for vehicle acceleration), lower weight, and longer life, compared to other Li-ion battery systems, such as nickel manganese cobalt (NMC) and nickel cobalt aluminum (NCA). One characteristic of LFP battery systems is a voltage "flat zone," which refers to LFP cells having almost the same voltage across a very wide range of state of charge (SOC). For example, the LFP cell voltage may be approximately the same between 95% and 15% SOC. This creates a problem for conventional SOC correction techniques. Accordingly, while such conventional electrified vehicle battery systems do work well for their intended purpose, there exists an opportunity for improvement in the relevant art.

SUMMARY

According to one example aspect of the invention, a static state of charge (SOC) correction system for a lithium iron phosphate (LFP) battery system of an electrified vehicle is presented. In one exemplary implementation, the static SOC correction system comprises a memory configured to store a calibrated look-up table relating (i) power-off times of the electrified vehicle and temperatures of the LFP battery system to (ii) self-discharge rates of the LFP battery system and a controller configured to access the memory and to, in response to a power-off of the electrified vehicle, (i) determine an initial SOC of the LFP battery system, (ii) initiate a power-off timer, and (iii) initiate a periodic temperature measurement of the LFP battery system, in response to a subsequent power-on of the electrified vehicle, (i) stop the power-off timer, (ii) determine an average of the periodic temperature measurements of the LFP battery system to obtain a measured temperature of the LFP battery system, and (iii) access the calibrated look-up table to determine a self-discharge rate of the LFP battery system based on a value of the power-off timer and the measured temperature of the LFP battery system, and determine a corrected SOC for the LFP battery system by determining an SOC change based on the determined self-discharge rate and subtracting the SOC change from the initial measured SOC.

In some implementations, the controller is further configured to communicate with a display device of a driver interface to command the display device to display a final SOC for the LFP battery system. In some implementations, the controller is further configured to determine whether the value of the power-off timer exceeds a minimum power-off threshold corresponding to a significant expected self-discharge of the LFP battery system. In some implementations, when the value of the power-off timer is less than the minimum power-off threshold, the controller is further configured to set the final SOC equal to the initial SOC of the LFP battery system.

In some implementations, when the value of the power-off timer is greater than the minimum power-off threshold, the controller is configured to set the final SOC equal to the corrected SOC for the LFP battery system. In some implementations, the calibrated look-up table includes at least two self-discharge rates and the controller is configured to perform linear extrapolation based on the at least two self-discharge rates to determine the self-discharge rate for the LFP battery system. In some implementations, the LFP battery system is characterized by a voltage flat zone between high and low voltage thresholds, and wherein the voltage flat zone prevents accurate operation of conventional SOC correction techniques. In some implementations, the electrified vehicle is an electrified sport utility vehicle (eSUV).

According to another example aspect of the invention, a static SOC correction method for an LFP battery system of an electrified vehicle is presented. In one exemplary implementation, the static SOC correction method comprises obtaining and storing, by a controller of the electrified vehicle and in a memory accessible by the controller, a calibrated look-up table relating (i) power-off times of the electrified vehicle and temperatures of the LFP battery system to (ii) self-discharge rates of the LFP battery system, in response to a power-off of the electrified vehicle, (i) determining, by the controller, an initial SOC of the LFP battery system, (ii) initiating, by the controller, a power-off timer, and (iii) initiating, by the controller, a periodic temperature measurement of the LFP battery system, in response to a subsequent power-on of the electrified vehicle, (i) stopping, by the controller, the power-off timer, (ii) determining, by the controller, an average of the periodic temperature measurements of the LFP battery system to obtain a measured temperature of the LFP battery system, and (iii) accessing, by the controller via the memory, the calibrated look-up table to determine a self-discharge rate of the LFP battery system based on a value of the power-off timer and the measured temperature of the LFP battery system, and determining, by the controller, a corrected SOC for the LFP battery system by determining an SOC change based on the determined self-discharge rate and subtracting the SOC change from the initial measured SOC.

In some implementations, the method further comprises communicating, by the controller and with a display device of a driver interface, to command the display device to display a final SOC for the LFP battery system. In some implementations, the method further comprises determining, by the controller, whether the value of the power-off timer exceeds a minimum power-off threshold corresponding to a significant expected self-discharge of the LFP battery system. In some implementations, the method further comprises when the value of the power-off timer is less than the minimum power-off threshold, setting, by the controller, the final SOC equal to the initial SOC of the LFP battery system.

In some implementations, the method further comprises when the value of the power-off timer is greater than the minimum power-off threshold, setting, by the controller, the final SOC equal to the corrected SOC for the LFP battery system. In some implementations, the calibrated look-up table includes at least two self-discharge rates and the controller is configured to perform linear extrapolation based on the at least two self-discharge rates to determine the self-discharge rate for the LFP battery system. In some implementations, the LFP battery system is characterized by a voltage flat zone between high and low voltage thresholds, and wherein the voltage flat zone prevents accurate operation of conventional SOC correction techniques. In some implementations, the electrified vehicle is an eSUV.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIG. 3 is a diagram of an example configuration for the SOC self-discharge rate look-up table that is generated or calibrated in an offline, testing environment according to the principles of the present application.

DESCRIPTION

Figure 1:
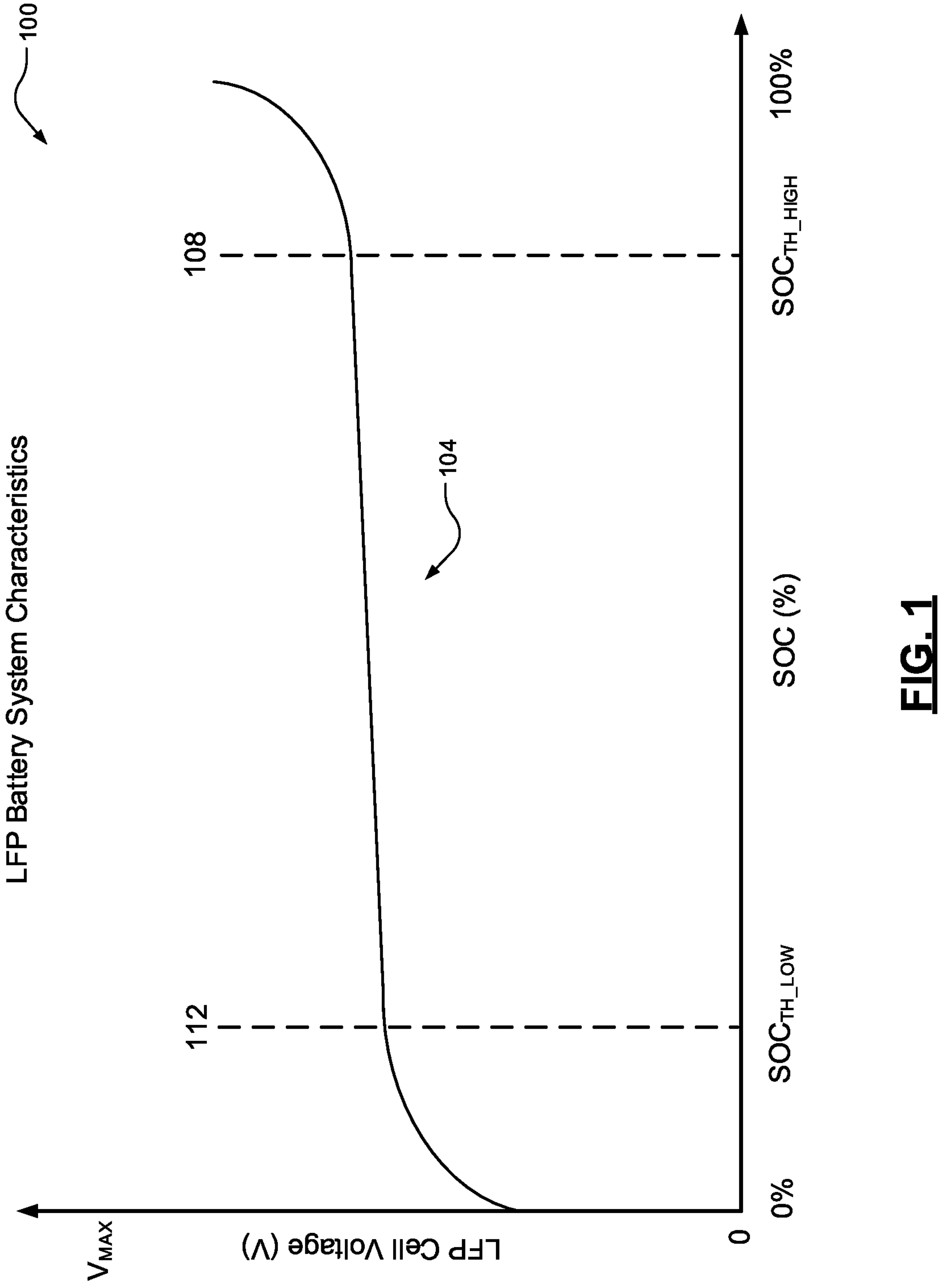
FIG. 1 is a plot of voltage versus state of charge for an example lithium iron phosphate (LiFePO4, or "LFP") battery cell according to the principles of the present application.

As previously discussed, one specific type of lithium ion (Li-ion) battery system is lithium iron phosphate (LiFePO4) or "LFP." LFP battery systems are particularly useful for electrified vehicle applications due to their high discharge rates (for vehicle acceleration), lower weight, and longer life, compared to other Li-ion battery systems, such as nickel manganese cobalt (NMC) and nickel cobalt aluminum (NCA). One characteristic of LFP battery systems is a voltage "flat zone," which refers to LFP cells having almost the same voltage across a very wide range of state of charge (SOC). For example, the LFP cell voltage may be approximately the same between 95% and 15% SOC. FIG. 1 illustrates an example plot 100 of voltage versus SOC for an example LFP battery cell according to the principles of the present application. As shown in the plot 100, the voltage flat zone 104 is present between high and low SOC thresholds 108 ($SOC_{TH\_HIGH}$) and 112 ($SOC_{TH\_LOW}$), respectively. As previously mentioned, this flat zone 104 creates a problem for conventional SOC correction techniques that require a substantial/discernible voltage difference (e.g., $V_2$-$V_1$) to correct the SOC of a battery system. This is particularly problematic after extended rest or sleep periods, during which the electrified vehicle is not being used and the LFP battery system's SOC slowly drops over time due to its own self-discharging (e.g., due to small loads and power being drawn from the LFP battery system).

For example, the electrified vehicle could be powered down/off when the LFP battery system SOC is at or above the high SOC threshold 108 and later awoken/powered on after the LFP battery system SOC enters the flat zone 104. Using conventional SOC correction techniques, the electrified vehicle would incorrectly display an SOC of ~95% (i.e., the high SOC threshold 108) until the actual SOC reaches the low SOC threshold 112 (e.g., ~15-20%), when the electrified vehicle would then switch to displaying the actual (corrected) SOC. This sudden drop in displayed SOC could be unexpected by the driver and could potentially result in the driver being stranded when the electrified vehicle's LFP battery system reaches a critical low SOC level, which could be approximately the same or only slightly less than the low SOC threshold 112. Accordingly, improved techniques for static SOC correction for LFP battery systems, such as for electrified vehicle applications, are presented herein. These techniques generate/calibrate a look-up table in an offline/testing environment, which is then stored in a memory (e.g., non-volatile memory, or NVM) and accessed by a controller of the electrified vehicle during operation.

The look-up table, an example of which is illustrated in FIG. 3, relates (i) power-off times of the electrified vehicle and temperatures of the LFP battery system to (ii) self-discharge rates of the LFP battery system. In response to a power-off of the electrified vehicle, the controller (i) determines an initial SOC of the LFP battery system, (ii) initiates a power-off timer, and (iii) initiates a periodic temperature measurement of the LFP battery system. In response to a subsequent power-on of the electrified vehicle, the controller (i) stops the power-off timer, (ii) determines an average of the periodic temperature measurements of the LFP battery system to obtain a measured temperature of the LFP battery system, and (iii) accesses the calibrated look-up table to determine a self-discharge rate of the LFP battery system based on a value of the power-off timer and the measured temperature of the LFP battery system. Finally, the controller determines a corrected SOC for the LFP battery system by determining an SOC change based on the determined self-discharge rate and subtracting the SOC change from the initial measured SOC.

As shown in FIG. 3, the look-up table includes characteristic measurements and the related algorithm needs input from preliminary characteristics of the LFP battery system. The test design for the illustrated look-up table could be designed according to an actual or desired risk control requirement. First, the SOC start and end value can be defined according to existing or conventional high SOC and low SOC correction methodology. Second, for different temperatures, there could be multiple tables of measurements (i.e., more than one look-up table). Thus, the term "look-up table" as used herein will be appreciated to refer to the use of both a single and multiple look-up tables, depending on the design complexity. If there is no requirement for high accuracy, in order to eliminate only the previously described safety risk, only one worst case temperature for self-discharge is could be acceptable. Third, the duration interval can be defined according to accuracy requirement. More specifically, at least two points (Minimum Time/# of Days and Maximum Time/# of Days) are required to enable linear estimation for all between points.

Figure 2:
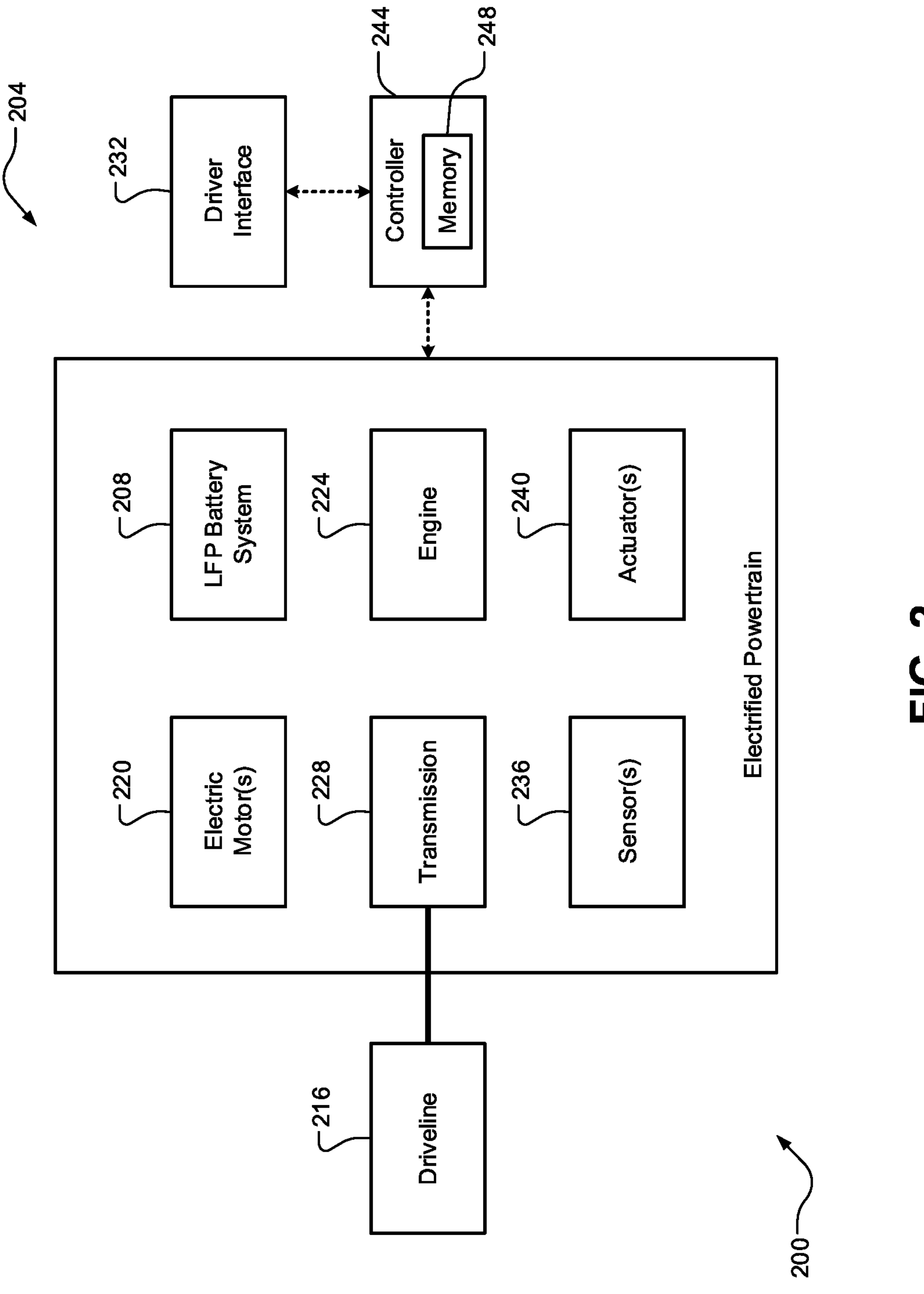
FIG. 2 is a functional block diagram of an electrified vehicle having an LFP battery system and an example static state of charge (SOC) correction system according to the principles of the present application.

Referring now to FIG. 2, a functional block diagram of an electrified vehicle 200 having an example static SOC correction system 204 for an LFP battery system 208 according to the principles of the present application is illustrated. The electrified vehicle 200 could have any suitable configuration, including, but not limited to, a battery electric vehicle (BEV), a plug-in hybrid electric vehicle (PHEV), and a range-extended electric vehicle (REEV). The electrified vehicle 200 comprises an electrified powertrain 212 configured to generate and transfer drive torque to a driveline 216 for vehicle propulsion. The electrified powertrain 212 comprises one or more electric motors 220 powered by the LFP battery system 208 and an optional internal combustion engine 224 configured to combust a mixture of air and fuel (gasoline, diesel, etc.) to generate torque. The torque generating devices 220, 224 are configured to collectively generate an amount of drive torque to satisfy a driver torque request, which is then transferred to the driveline 216 via a transmission 228 (e.g., a multi-speed, torque converted automatic transmission).

The driver torque request could be provided by a driver via a driver interface 232, which could include various input/output devices including, but not limited to, accelerator/brake pedals, a display device, and a power on/off switch for the electrified vehicle 200. The electrified powertrain 212 also has one or more sensors 236 and one or more actuators 240 associated therewith. These sensor(s) 236 measure various operating parameters of the electrified vehicle 200, including, but not limited to, current/voltage/temperature of the LFP battery system 208 and ambient temperature. The actuator(s) 240 control various components of the electrified powertrain 212, such as, but not limited to, power (e.g., current) provided to the electric motor(s) 220 and torque control devices (throttle valve, fuel injectors, a spark/ignition system, not shown) of the engine 224 such that the driver torque request is satisfied. A controller 244 having a memory 248 (e.g., NVM) controls operation of the electric vehicle 200 and, more particularly, the electrified powertrain 208. The controller 244 is also configured to perform at least a portion of the static SOC correction techniques of the present application, which will now be discussed in greater detail.

Figure 4A:
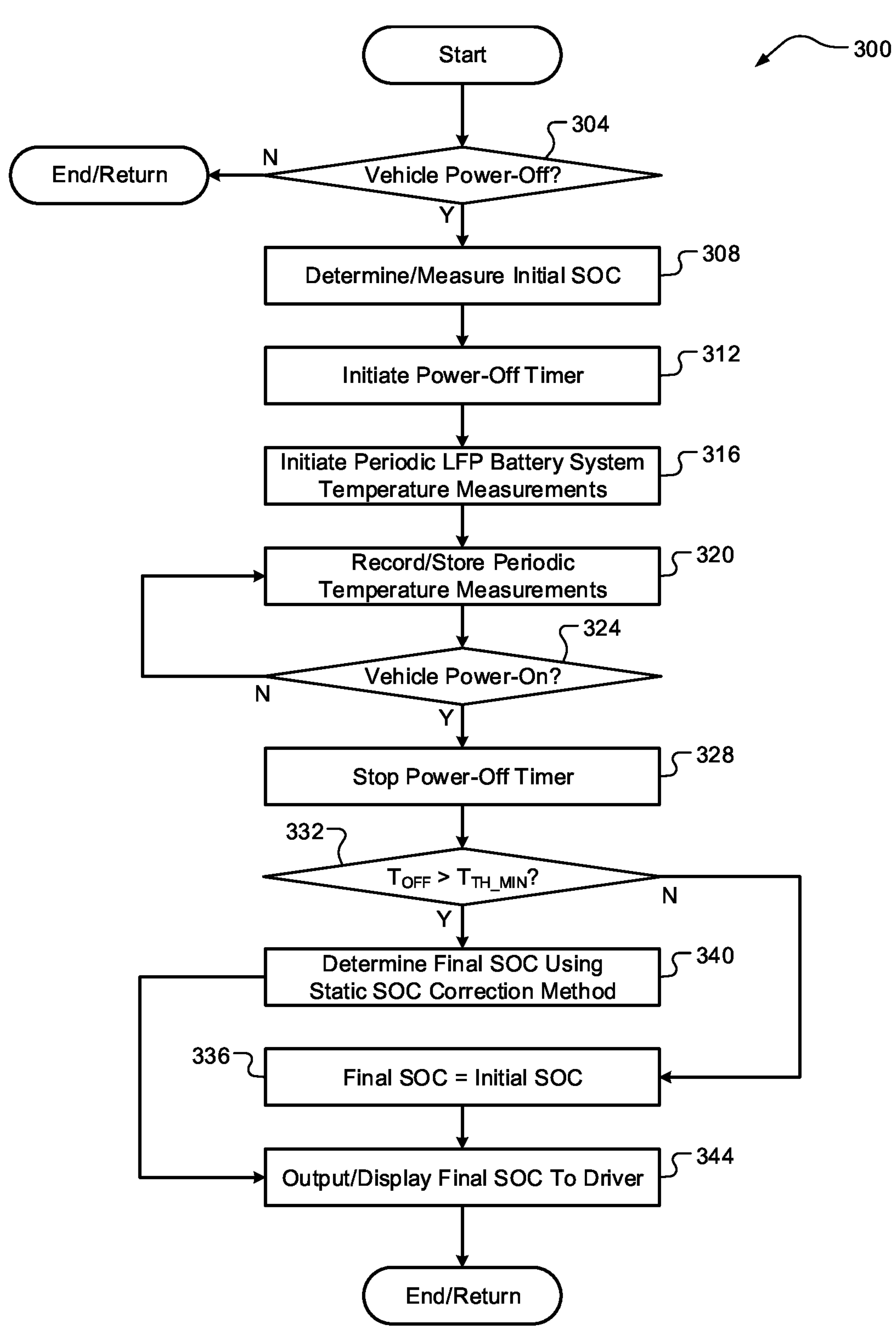
FIGS. 4A-4B are flow diagrams of an example static SOC correction method and example static SOC correction technique for an electrified vehicle LFP battery system according to the principles of the present application.
Figure 4B:
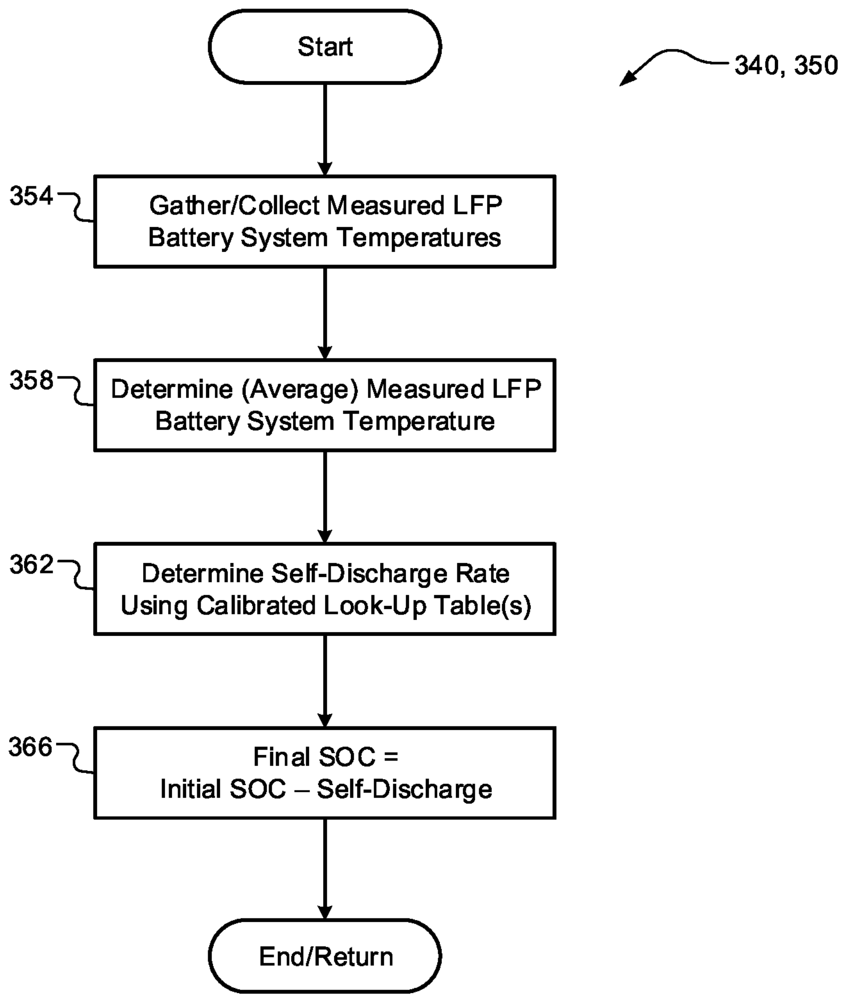

FIGS. 4A-4B are flow diagrams of an example static SOC correction method 300 for an LFP battery system of an electrified vehicle and example static SOC correction method 350 using a calibrated look-up table for LFP battery system self-discharge rates according to the principles of the present application. While these methods 300, 350 are described with specific reference to the electrified vehicle 200 and LFP battery system 208 for illustrative/descriptive purposes, it will be appreciated that these methods 300, 350 could be applicable to any suitable LFP battery systems and electrified vehicles.

In FIG. 4A, the method 300 begins at 304. At 304, the controller 244 determines whether the electrified vehicle 200 is powered-off or powered-down. This could occur, for example, in response to a driver input via the driver interface 232. When false, the method 300 ends or returns to 304. When true, the method 300 proceeds to 308. At 308, the controller 244 records or measures the initial SOC of the LFP battery system 208 (e.g., using sensor(s) 236). At 312, the controller 244 initiates the power-off timer. At 316, the controller 244 initiates periodic temperature measurement or recording (e.g., by sensor(s) 236. At 320, the controller 244 records or stores the periodic temperature measurements. These periodic temperature measurements could be, for example only, once per day or every 24 hours. It will be appreciated that operations 308-320 could be performed in a sequence as shown or as simultaneous or overlapping operations. At 324, the controller 244 determines whether the electrified vehicle 200 is being powered-on or powered-up. This could occur, for example, in response to another driver input via the driver interface 232. When false, the method 300 ends or returns to 320. When true, the method 300 proceeds to 328. At 328, the controller 244 stops the power-off timer.

At 332, the controller 144 determines whether the value ($T_{OFF}$) of the power-off timer exceeds a minimum threshold ($T_{TH\_MIN}$; e.g., a minimum number of days at which significant SOC self-discharge is expected). This could be, for example only, a number of days at which ~4% self-discharge is expected. When false, the method 300 proceeds to 336 where the controller 244 assumes there to be no significant self-discharge of the LFP battery system and the final SOC is kept at the initial SOC at 344 (i.e., no correction occurs) and the method 300 then ends. This final step 344 could also include displaying the final SOC of the LFP battery system 208 to the driver, such as via the display device of the driver interface 232. When true, the method 300 proceeds to 340 where the controller 244 performs a static SOC correction method 350 using the calibrated look-up table to determine the final SOC of the LFP battery system 208, which is different and less than the initial SOC. This static SOC correction method 350 is illustrated in greater detail in FIG. 4B and described more fully below.

In FIG. 4B, the static SOC correction method 350 begins at 354 where the controller 244 gathers or collects the plurality of periodically measured temperatures of the LFP battery system 208. At 358, the controller 244 calculates an average of the plurality of measured temperatures to obtain a single measured temperature of the LFP battery system 208. At 362, the controller 244 accesses the calibrated look-up table and, using the initial SOC, the value of the power-off timer, and the (average) measured temperature of the LFP battery system 208, the controller 244 determines a self-discharge rate of the LFP battery system 208. This could include, for example only, a linear interpolation calculation between the various stored values/points of the calibrated look-up table. At 366, the controller 244 determines the final SOC by subtracting the self-discharge rate (or, if the self-discharge rate is an actual rate, a product of the rate and the value of the power-off timer) from the initial SOC to obtain the final SOC. This sub-method 350 then ends, and in the method 300 of FIG. 4A, the final (corrected) SOC is then displayed to the driver via the display device of the driver interface 232 at 344.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A static state of charge (SOC) correction method for a lithium iron phosphate (LFP) battery system of an electrified vehicle, the static SOC correction method comprising:

obtaining and storing, by a controller of the electrified vehicle and in a memory accessible by the controller, a calibrated look-up table relating (i) power-off times of the electrified vehicle and temperatures of the LFP battery system to (ii) self-discharge rates of the LFP battery system, wherein the self-discharge rates of the LFP battery system corresponds to periods where an active C-rate discharge of the LFP battery system is not commanded;

detecting, by the controller, a power-off of the electrified vehicle;

in response to detecting the power-off of the electrified vehicle, (i) determining, by the controller, an initial SOC of the LFP battery system, (ii) initiating, by the controller, a power-off timer, and (iii) initiating, by the controller, a periodic temperature measurement of the LFP battery system;

after detecting the power-off of the electrified vehicle, detecting, by the controller, a subsequent power-on of the electrified vehicle;

in response to detecting the subsequent power-on of the electrified vehicle, (i) stopping, by the controller, the power-off timer, (ii) determining, by the controller, an average of the periodic temperature measurements of the LFP battery system to obtain a measured temperature of the LFP battery system, and (iii) accessing, by the controller via the memory, the calibrated look-up table to determine an actual self-discharge rate of the LFP battery system based on a value of the power-off timer and the measured temperature of the LFP battery system; and determining, by the controller, a corrected SOC for the LFP battery system by determining an SOC change based on the determined actual self-discharge rate and subtracting the SOC change from the initial measured SOC.

2. The static SOC correction method of claim 1, further comprising communicating, by the controller and with a display device of a driver interface, to command the display device to display a final SOC for the LFP battery system.

3. The static SOC correction method of claim 2, further comprising determining, by the controller, whether the value of the power-off timer exceeds a minimum power-off threshold corresponding to an expected self-discharge of the LFP battery system.

4. The static SOC correction method of claim 3, further comprising when the value of the power-off timer does not exceed the minimum power-off threshold, setting, by the controller, the final SOC equal to the initial SOC of the LFP battery system.

5. The static SOC correction method of claim 3, further comprising when the value of the power-off timer exceeds the minimum power-off threshold, setting, by the controller, the final SOC equal to the corrected SOC for the LFP battery system.

6. The static SOC correction method of claim 1, wherein the calibrated look-up table includes at least two self-discharge rates and the controller is configured to perform linear extrapolation based on the at least two self-discharge rates to determine the self-discharge rate for the LFP battery system.

7. The static SOC correction method of claim 1, wherein the LFP battery system is characterized by a voltage flat zone between high and low voltage thresholds, and wherein the voltage flat zone prevents operation of other SOC correction techniques.

8. The static SOC correction method of claim 1, wherein the electrified vehicle is an electrified sport utility vehicle (eSUV).

9. A static state of charge (SOC) correction system for a lithium iron phosphate (LFP) battery system of an electrified vehicle, the static SOC correction system comprising:

a memory configured to store a calibrated look-up table relating (i) power-off times of the electrified vehicle and temperatures of the LFP battery system to (ii) self-discharge rates of the LFP battery system, wherein the self-discharge rates of the LFP battery system corresponds to periods where an active C-rate discharge of the LFP battery system is not commanded; and a controller configured to access the memory and to:

detect a power-off of the electrified vehicle;

in response to detecting the power-off of the electrified vehicle, (i) determine an initial SOC of the LFP battery system, (ii) initiate a power-off timer, and (iii) initiate a periodic temperature measurement of the LFP battery system;

after detecting the power-off of the electrified vehicle, detect a subsequent power-on of the electrified vehicle;

in response to detecting the subsequent power-on of the electrified vehicle, (i) stop the power-off timer, (ii) determine an average of the periodic temperature measurements of the LFP battery system to obtain a measured temperature of the LFP battery system, and (iii) access the calibrated look-up table to determine an actual self-discharge rate of the LFP battery system based on a value of the power-off timer and the measured temperature of the LFP battery system; and determine a corrected SOC for the LFP battery system by determining an SOC change based on the determined actual self-discharge rate and subtracting the SOC change from the initial measured SOC.

10. The static SOC correction system of claim 9, wherein the controller is further configured to communicate with a display device of a driver interface to command the display device to display a final SOC for the LFP battery system.

11. The static SOC correction system of claim 10, wherein the controller is further configured to determine whether the value of the power-off timer exceeds a minimum power-off threshold corresponding to an expected self-discharge of the LFP battery system.

12. The static SOC correction system of claim 11, wherein when the value of the power-off timer does not exceed the minimum power-off threshold, the controller is further configured to set the final SOC equal to the initial SOC of the LFP battery system.

13. The static SOC correction system of claim 11, wherein when the value of the power-off timer exceeds the minimum power-off threshold, the controller is configured to set the final SOC equal to the corrected SOC for the LFP battery system.

14. The static SOC correction system of claim 9, wherein the calibrated look-up table includes at least two self-discharge rates and the controller is configured to perform linear extrapolation based on the at least two self-discharge rates to determine the self-discharge rate for the LFP battery system.

15. The static SOC correction system of claim 9, wherein the LFP battery system is characterized by a voltage flat zone between high and low voltage thresholds, and wherein the voltage flat zone prevents operation of other SOC correction techniques.

16. The static SOC correction system of claim 9, wherein the electrified vehicle is an electrified sport utility vehicle (eSUV).

* * * * *